United States Patent [19]

Miyao

[11] 4,096,768
[45] Jun. 27, 1978

[54] HYDRO-MECHANICAL TRANSMISSION
[75] Inventor: Takayuki Miyao, Toyota, Japan
[73] Assignee: Aisin Seiki Kabushiki Kaisha, Japan
[21] Appl. No.: 619,386
[22] Filed: Oct. 3, 1975
[30] Foreign Application Priority Data
Oct. 3, 1974 Japan .................. 49-114195
[51] Int. Cl.² .................. B60K 41/00; F16H 47/04
[52] U.S. Cl. .......................... 74/865; 74/687
[58] Field of Search .......... 74/687, 865, 866
[56] References Cited
U.S. PATENT DOCUMENTS

| | | | |
|---|---|---|---|
| 2,222,144 | 11/1940 | Ferris | 74/687 X |
| 3,455,184 | 7/1969 | Frandsen et al. | 74/687 |
| 3,808,738 | 5/1974 | Siebers et al. | 74/866 X |
| 3,903,756 | 9/1975 | Hamma | 74/687 |
| 3,913,325 | 10/1975 | Miyao et al. | 74/687 X |
| 3,969,958 | 7/1976 | Miyao et al. | 74/687 |

Primary Examiner—Samuel Scott
Assistant Examiner—Carl F. Pietruszka
Attorney, Agent, or Firm—Oblon, Fisher, Spivak, McClelland & Maier

[57] ABSTRACT

In a hydro-mechanical transmission for automobiles which has an input shaft, an output shaft, a differential gear set including an input element connected to the input shaft and an output element connected to the output shaft and two reaction elements, a first positive displacement hydraulic pump-motor connected to the input shaft, a second hydraulic pump-motor connected to the first hydraulic pump-motor through a pair of conduits, a first clutch for performing the low operational mode of the low speed ratio by connecting the second hydraulic pump-motor to one of the two reaction elements, and a second clutch for performing the high operational mode of the high speed ratio by connecting the second hydraulic pump-motor to the other reaction element, the operational modes being switched over when the rotational speed of the first clutch corresponds to or is synchronized with that of the second clutch, the improvement being, whether a setting signal is generated for increasing or decreasing the speed ratio, the signal is detected simultaneously with the correspondence of the rotational speed of each clutch, and upon correspondence thereof, the clutches are operated so as to perform the high operational mode when the setting signal is for increasing the speed ratio and to perform the low operational mode when the setting signal is for decreasing the speed ratio.

4 Claims, 6 Drawing Figures

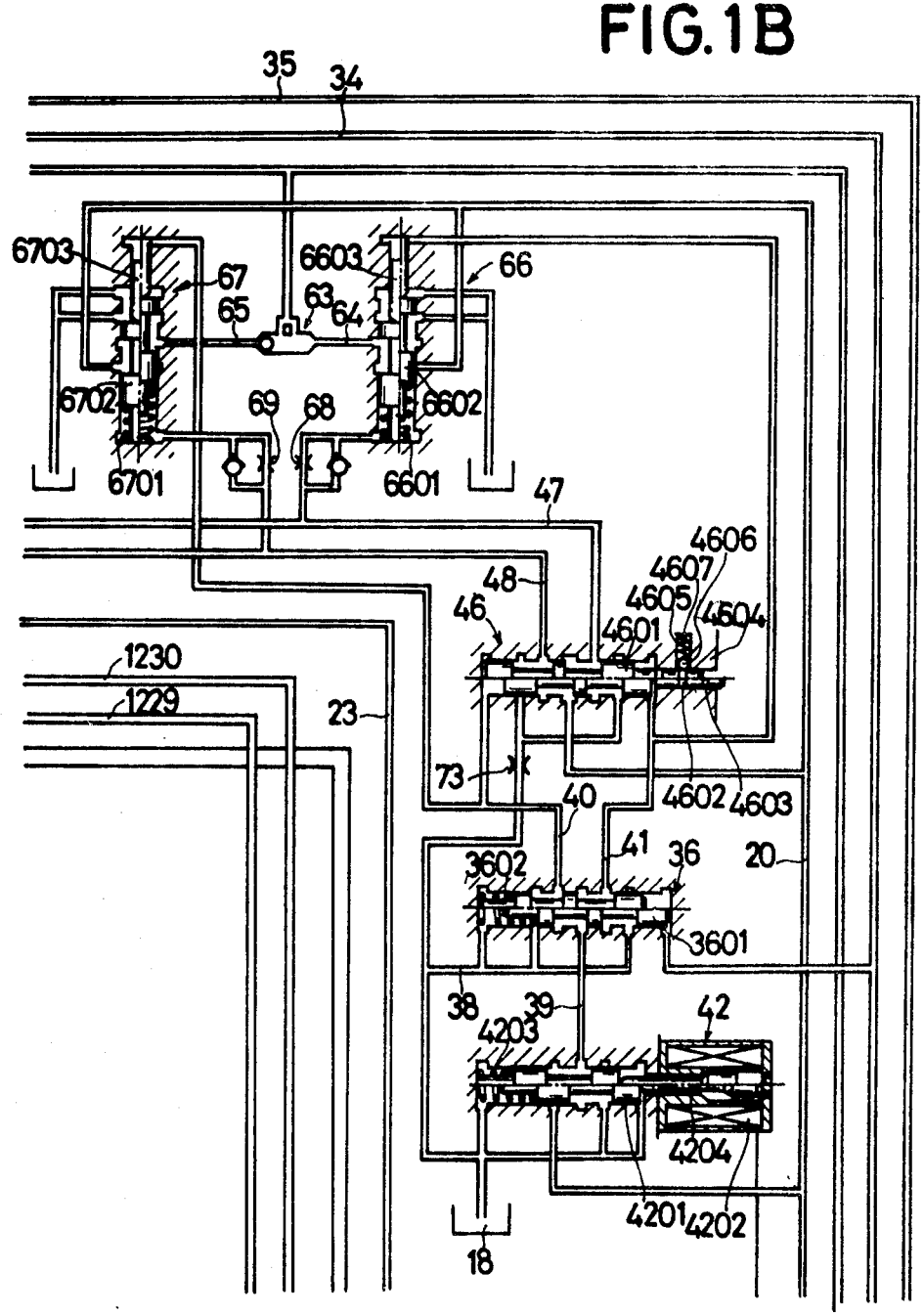

HYDRO-MECHANICAL TRANSMISSION

BACKGROUND OF THE INVENTION

Field of the Invention

The present invention relates generally to transmissions and more particularly to a hydro-mechanical transmission which includes a hydraulically controlled means drivingly connected to an output means for transmitting the rotational torque of an input means to the output means and a hydraulic positive displacement pump-motor driven by the input means for hydraulically controlling a reaction element provided within the hydraulically controlled means in response to the displacement ratio thereof. The hydro-mechanical transmission thus includes a first clutch for performing the low operational mode, a second clutch for performing the high operational mode, and a clutch control means for switching over between the operational modes.

SUMMARY OF THE INVENTION

Accordingly, it is an object of the present invention to provide a hydro-mechanical transmission wherein the switching over of the operation of the first and second clutches may be synchronously achieved thereby diminishing the frictional wear and shocks upon the clutches so as to increase the durability of the clutches.

Another object of the present invention is to provide a hydro-mechanical transmission wherein a setting signal is generated for increasing or decreasing the transmission speed ratio, and thus, when the setting signal for increasing the speed ratio is detected upon correspondence of the rotational speed of the clutches, a high operational mode is achieved, while when the setting signal for decreasing the speed ratio is detected upon correspondence of the clutches, a low operational mode is achieved.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIGS. 1A, 1B, and 1C are schematic diagrams of the hydraulic components and circuits of the hydro-mechanical transmission constructed in accordance with the present invention;

DETAILED DESCRIPTION OF THE PREFERRED EMBODIMENTS

Figure 1:
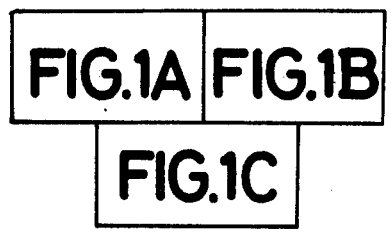
FIG. 1 is a schematic layout diagram relating the dispositions of the structural components schematically illustrated within FIGS. 1A, 1B, and 1C.
Figure 1A:
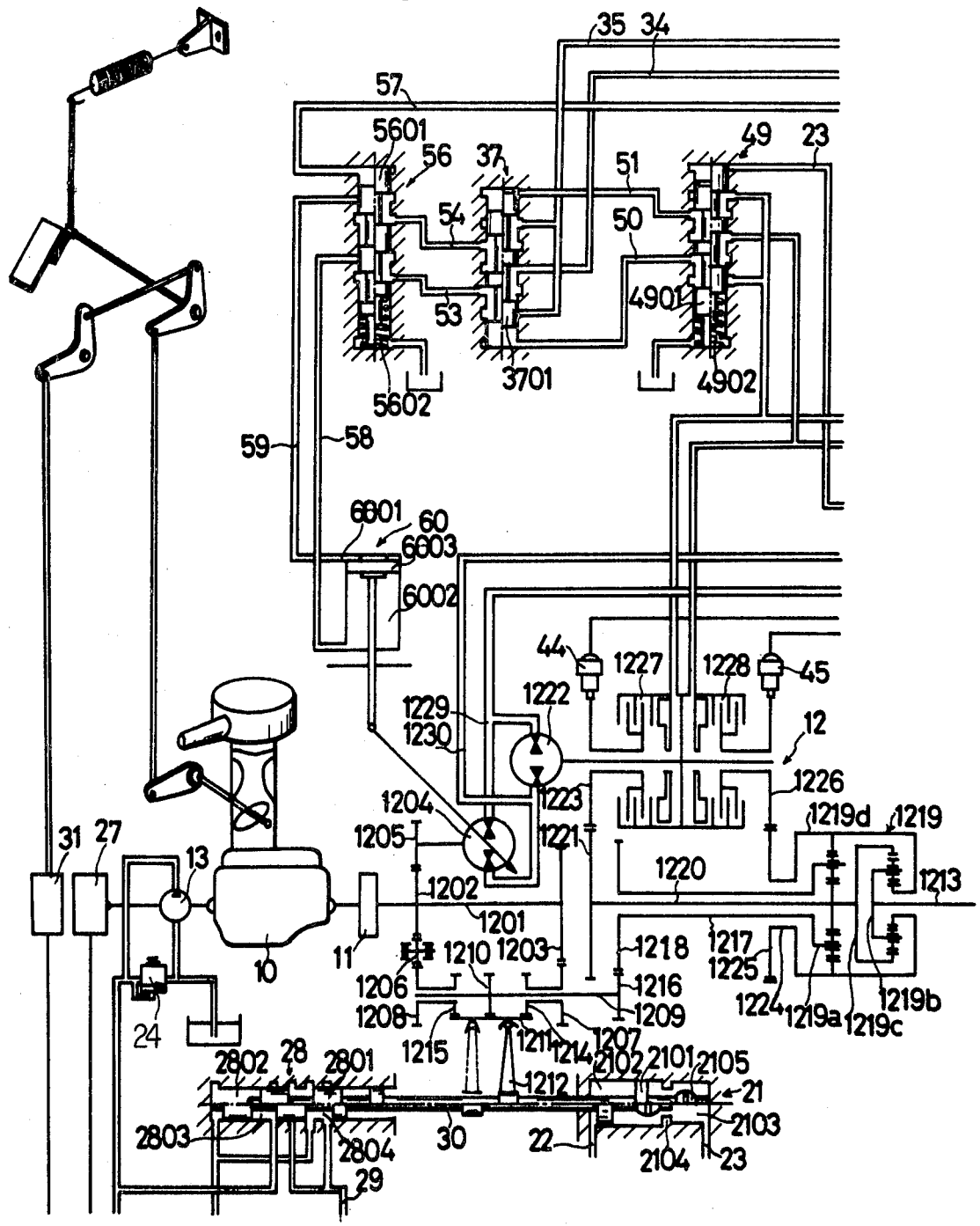

Referring now to the drawings, and more particularly to FIGS. 1A and 1B thereof, a prime mover engine 10 is provided for rotatably actuating a flywheel 11, an input shaft 1201 of a hydrostatic transmission, generally indicated by the reference character 12, and an oil pressure pump 13 disposed upon the opposite side of the engine 10 than that of flywheel 11. Gears 1202 and 1203 are mounted upon the input shaft 1201 of hydrostatic transmission 12 and it is seen that gear 1202 is enmeshed with a gear 1205 which is connected with the rotatable shaft of a first positive displacement pump motor 1204, as well as with an idler gear 1206, while the gear 1203 is enmeshed with a gear 1207. A gear 1208 is in turn engaged with the idler gear 1206 and is rotatably mounted upon a rotatable shaft 1209 as is the gear 1207. A hub 1210 is connected with the rotatable shaft 1209 and is interposed between the gears 1207 and 1208 so as to thereby permit slidable movement of a clutch sleeve 1211 which may result in unitary rotation therebetween.

A fork member 1212 is operatively engaged with the clutch sleeve 1211 for slidably operating the same, and in this manner, when the clutch sleeve 1211 is moved forwardly so as to be enmeshed with a clutch gear 1214 provided upon the gear 1207, an output shaft 1213 is rotated in the same direction as the input shaft 1201, while, when the clutch sleeve 1211 is moved backwardly so as to be enmeshed with a clutch gear 1215 provided upon the gear 1208, the output shaft 1213 is rotated in a direction opposite the direction of rotation of the input shaft 1201. It is to be noted that although the clutch sleeve 1211 may be in a position wherein the clutch sleeve 1211 is not enmeshed with either of the clutch gears 1214 or 1215, such will only occur for a short period of time when the clutch sleeve 1211 is shifted from engagement with one of the gears 1214 and 1215 to engagement with the other gear.

A gear 1216 connected upon one end of the rotatable shaft 1209 is enmeshed with a gear 1218 secured upon one end of a hollow rotatable shaft 1217 which is in turn connected with an input element 1219a of a differential gear set generally indicated by the reference character 1219. The differential gear set 1219 is constructed so as to combine a pair of simple planetary gear mechanisms of the same dimension, the sun gear of the first train, located at the side of the input shaft 1201, being rotatable with the ring gear of the second train, while the ring gear of the first train is rotatable with the sun gear of the second train. The input element 1219a of the differential gear set 1219 is the carrier of the first train, an output element 1219b thereof is the carrier of the second train and is connected with the output shaft 1213, the sun gear of the first train and the ring gear of the second train constitute a first reaction element 1219c, and the ring gear of the first train and the sun gear of the second train constitute a second reaction element 1219d.

The first reaction element 1219c is connected with a rotatable shaft 1220 which is disposed within shaft 1217 and to which a gear 1221 is connected and the gear 1221 is enmeshed with a gear 1223 provided upon the rotatable shaft of a second hydraulic pump-motor 1222. A hollow rotatable shaft 1224, disposed concentrically about shaft 1217, is connected with the second reaction element 1219d and a gear 1225 which is connected to the hollow shaft 1224 is enmeshed with a gear 1226 which is also provided upon the rotatable shaft of the second hydraulic pump-motor 1222. Both of the gears 1223 and 1226 are rotatable with respect to the shaft of the second hydraulic pump-motor 1222, and it is also seen that the gear 1223 is connected to one of the rotational members of a first clutch 1227 while the gear 1226 is similarly connected to one of the rotational members of a second clutch 1228. The first clutch 1227 and the second clutch 1228 are friction clutches operable by means of hydraulic pressure and the other rotational members of the clutches are likewise connected to the rotatable shaft of the second hydraulic pump-motor 1222.

Figure 1C:
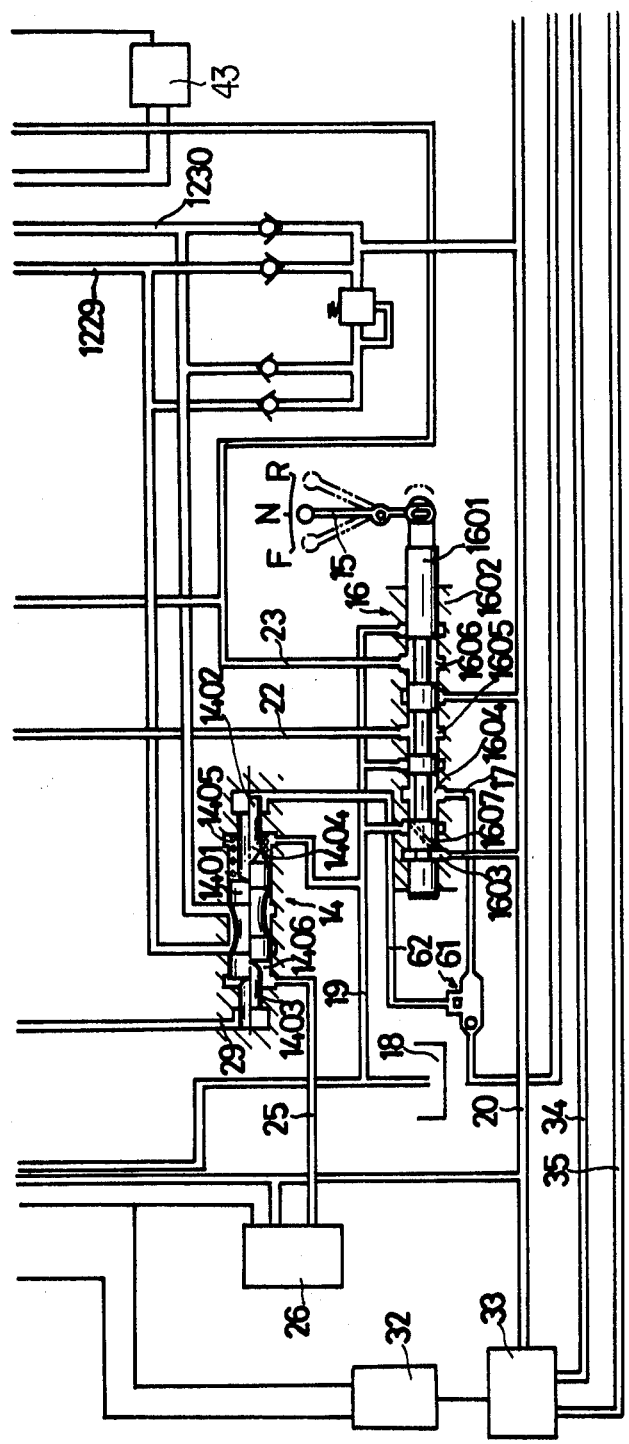

The second hydraulic pump-motor 1222 is in communication with the first hydraulic pump-motor 1204 through means of a pair of conduits 1229 and 1230 which are, in turn, in communication with a by-pass clutch valve, generally indicated by the reference character 14, as seen in FIG. 1C, the fluid communication between the conduits 1229 and 1230 being controlled by means of the by-pass clutch valve 14. When the conduits 1229 and 1230 are in communication with each other by means of the by-pass valve 14, no power is transmitted from the input shaft 1201 to the output shaft 1213 even if the clutch sleeve 1211 is brought into meshing position with either one of the clutch gears 1214 and 1215 so as to actuate one of the first and second clutches 1227 and 1228. As a result, the hydro-mechanical transmission is in the neutral position.

When the clutch sleeve 1211 is enmeshed with the clutch gear 1214 and the first clutch 1227 is actuated, the low forward drive mode of operation is achieved, and when the communication between the conduits 1229 and 1230 is interrupted by means of the by-pass clutch valve 14 so as to permit power transmission between the input and the output shafts 1201 and 1213, the speed ratio, that is, the rotational speed of the output shaft 1213 relative to the rotational speed of the input shaft 1201, is varied in response to the change in the displacement of the first hydraulic pump-motor 1204. More particularly, during the low forward drive mode of operation, the speed ratio is varied from zero to the mode switching over speed ratio $e^*$ (see FIG. 2) wherein the rotational speed of the first clutch 1227 is adapted to correspond to that of the second clutch 1228. In case it is necessary to obtain a higher speed ratio than the mode switching over speed ratio $e^*$ during the forward drive operation, the second clutch 1228 is actuated at the mode changing or switching-over speed ratio $e^*$ while the first clutch 1227 is not actuated in order to change to a high mode operation from the low mode operation, and subsequently, the displacement of the first hydraulic pump-motor 1204 is varied so as to change the speed ratio and thereby acquire the desired speed ratio. Within the high forward drive mode of operation, it is possible to obtain a speed ratio between the mode switch-over speed ratio $e^*$ and the maximum speed ratio.

When the clutch sleeve 1211 is enmeshed with the clutch gear 1215 and the first clutch 1227, the reverse drive operation is completed, and when communication between the conduits 1229 and 1230 is interrupted by means of the by-pass clutch valve 14, power may be transmitted to the output shaft 1213 from the input shaft 1201, and the speed ratio may be varied from zero to the mode switching-over speed ratio $-e^*$ by varying the displacement of the first hydraulic pump-motor 1204. When it is necessary to obtain a higher speed ratio than the mode switching-over speed ratio $-e^*$, the second clutch 1228 is actuated at the mode switching-over speed ratio $-e^*$ wherein the rotational speed of the first clutch 1227 corresponds to that of the second clutch 1228, while the first clutch 1227 is not actuated, in order to change to the high mode operation from the low mode operation, and subsequently, the speed ratio is varied by changing the displacement of the first hydraulic pump-motor 1204 thereby obtaining the desired speed ratio.

Figure 2:
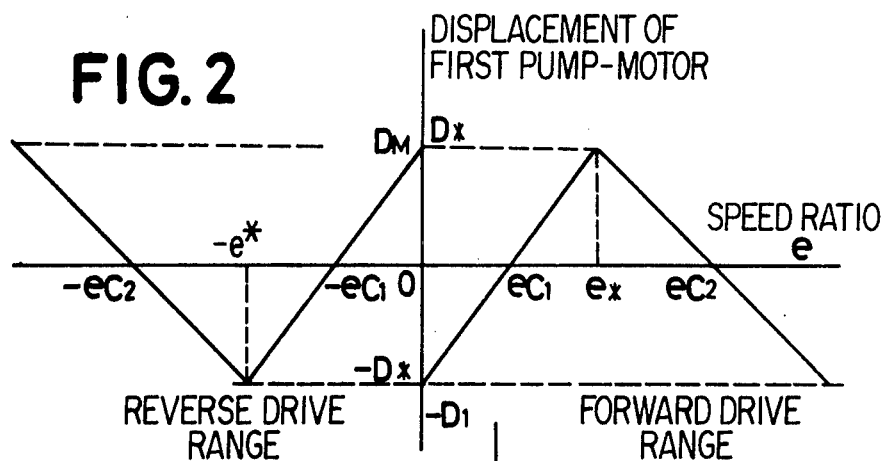
FIG. 2 is a graphical diagram showing the relationship between the speed ratio and the displacement of the first hydraulic pump-motor.

The relationship between the speed ratio and the displacement of the first hydraulic pump-motor 1204 during the forward and reverse drive operations is diagrammatically shown within FIG. 2 if there is no oil leakage within the first and second pump-motors 1204 and 1222 or the conduits 1229 and 1230 and the standard speed ratio, which is the speed ratio when the second hydraulic pump-motor 1222 is stationary, is $ec_1$ or $-ec_1$ during the low mode, and $ec_2$ or $-ec_2$ during the high mode.

A manual lever 15 (see FIG. 1C) is connected to a slidable spool 1601 of a spool valve, generally indicated by the reference character 16, and the spool 1601 is provided with five lands so as to define four annular chambers or passages 1603, 1604, 1605 and 1606 between each land and a housing 1602, an internal passage 1607 being provided within spool 1601 for providing fluidic communication between annular passage 1603 and annular passage 1604.

When the manual lever 15 is in the neutral position N, a conduit 17 is interrupted or blocked from communicating with a conduit 19 fluidically connected to a reservoir 18 and is in communication with a conduit 20, through means of passage 1607, which is in turn in communication with the outlet of pump 13. At the same time, a pair of conduits 22 and 23 which are in communication with an actuator, generally indicated by the reference character 21, for operating the fork member 1212, are also interrupted or blocked from communicating with the conduits 19 and 20, respectively.

When the manual lever 15 is in the forward drive position F, conduit 17 is interrupted or blocked from communicating with conduit 20 and is in communication with conduit 19, conduit 22 is similarly interrupted or blocked from communicating with conduit 19 but is in communication with conduit 20, and conduit 23 is interrupted or blocked from communicating with conduit 20 but is in communication with conduit 19.

Likewise, when the manual lever 15 is in the reverse drive position R, conduit 17 is interrupted or blocked from communicating with conduit 20 and is in communication with conduit 19, conduit 22 is interrupted or blocked from communicating with conduit 20 and is in communication with conduit 19, and conduit 23 is interrupted or blocked from communicating with conduit 19 and is in communication with conduit 20.

The conduit 17 is also in communication with a conduit 62 through means of a shuttle valve 61 and the conduit 20 is supplied with a constant hydraulic pressure due to the pump 13 and a relief valve 24.

The by-pass clutch valve 14 includes a spool 1401 having a land at each end thereof, and a pair of pistons 1402 and 1403 disposed at each end of the spool 1401. A hydraulic chamber 1404 defined within the right end of the valve 14 is in communication with the conduit 19, and a spring 1405 is disposed within chamber 1404 for biasing the spool 1401 toward the left. A hydraulic chamber 1406 is similarly defined within the left end of the valve 14 and is in communication with a conduit 25 to which hydraulic pressure is supplied through means of an electric-hydraulic convertor 26 which is fluidically connected to conduit 20, the electric-hydraulic convertor 26 being responsive to the output of an electric convertor 27 which is driven as a function of the engine rotational speed so as to control the hydraulic pressure of the conduit 25 in proportion to the engine rotational speed.

Conduits 1229 and 1230 are in communication with each other by means of the spool 1401 of by-pass clutch valve 14 during the idle rotating speed mode of the engine, and the conduits 1229 and 1230 are interrupted or blocked from communicating with each other when the engine is rotated above its idle rotating speed. The piston 1402 may be moved toward the left so as to in turn bias the spool 1401 in the left direction due to the hydraulic pressure within conduit 62, and it is to be noted that the spool 1401 is in fact forced to move in the direction whereby the conduit 1229 is in communication with the conduit 1230 when the constant pressure of the conduit 20 is supplied to the conduit 62, even if the spool 1401 is being subjected to the pressure within conduit 25 which would normally tend to position the same whereby communication between conduit 1229 and conduit 1230 would be interrupted or terminated. Similarly, piston 1403 is moved toward the right so as to in turn bias the spool 1401 in the right direction due to the pressure within conduit 29 which is in communication with a spool valve, generally indicated by the reference character 28.

The spool valve 28, as best seen in FIG. 1A, includes a spool 2801 which is integral with an operating shaft 30 of the fork member 1212, and the spool 2801 is provided with three lands which define, along with housing 2802, annular passages 2803 and 2804. The conduit 29 is selectively connected with either one of the conduits 19 and 20 by means of the spool valve 28 in accordance with the position of the fork member 1212 and when the fork member 1212 is in the position whereby the clutch sleeve 1211 is enmeshed with the clutch gear 1214 or 1215, communication between conduit 29 and conduit 20 is interrupted while communication with conduit 19 is established. Similarly, when the fork member 1212 is in the position whereby the clutch sleeve 1211 is enmeshed with neither one of the clutch gears 1214 and 1215, conduit 29 is not connected with conduit 19 and is in communication with conduit 20.

The actuator 21 includes a piston 2101 which is also integral with shaft 30, a left chamber 2102 which is in fluidic communication with conduit 22, and a right chamber 2103 which is in fluidic communication with conduit 23. An annular radially inward projection 2104 is provided upon the interior wall of the right chamber 2103 and a head 2105, integral with shaft 30, is adapted to pass through the projection 2104 when the clutch sleeve 1211 is shifted thereby altering the shifting speed mode of the sleeve 1211 between rapid-slow-rapid phases or periods.

An electric convertor 31 is provided for supplying an engine speed setting signal corresponding to the throttle opening of the engine to a comparative amplifier 32 as seen in FIGS. 1A and 1C, and as the throttle opening is increased from the minimum to the maximum degree, the engine speed setting signal is likewise increased, while as the throttle opening is decreased, the engine speed signal is correspondingly decreased. Within the comparative amplifier 32, the engine speed setting signal and the engine speed feedback signal supplied from the electric convertor 27 are compared with each other, and when the engine speed setting signal is greater than the engine speed feedback signal, a setting signal for decreasing the speed ratio is generated so as to be applied to a servo valve 33, and on the contrary, when the engine speed setting signal is less than the engine speed feedback signal, a setting signal for increasing the speed ratio is generated so as to be applied to the servo valve 33.

The conduit 34 is in communication with spool valves, generally indicated by the reference characters 36 and 37, while the conduit 35 is in communication with the spool valve 37, the spool valve 36, as best seen in FIG. 1B, including a spool 3601, having three lands, and which is biased so as to move in the leftward direction by means of the pressure within conduit 34 and being biased so as to move in the rightward direction by means of a spring 3602. When the conduit 34 is supplied with the constant hydraulic pressure of conduit 20, the spool valve 36 serves to communicate a conduit 38 with a conduit 40 and a conduit 39 with a conduit 41, and when the constant pressure is not supplied to conduit 34, the conduits 38 and 39 are in communication with the conduits 41 and 40, respectively. The conduit 38 is also in communication with the reservoir 18 and the conduit 39 is also in communication with a solenoid valve, generally indicated by the reference character 42 which includes a spool 4201 having two lands, a solenoid 4202, and a plunger 4204. Upon energization of the solenoid 4202 the spool 4201 is moved toward the left, against the biasing force of a spring 4203, by means of the plunger 4204, and when the solenoid 4202 is deenergized, fluidic communication between conduit 39 and conduit 20 is interrupted and communication with conduit 38 is established, while when solenoid 4202 is energized, communication between conduit 39 and conduit 38 is interrupted and communication with conduit 20 is established.

The solenoid 4202 is further connected to a calculator 43 which is in turn connected both to a first detector 44 for detecting the rotational speed of the first clutch 1227 from gear 1223 of the transmission 12 and to a second detector 45 for detecting the rotational speed of the second clutch 1228 from gear 1226. Only when the rotational speed of the first clutch 1227 is the same as that of the second clutch 1228, may the solenoid 4202 be energized.

A spool valve, generally indicated by the reference character 46, is connected to conduits 40 and 41 and is seen to include a spool 4601 having three lands. The spool 4601 is moved toward the right by means of the fluid pressure within conduit 40 and is likewise moved toward the left by means of the fluid pressure within conduit 41. When the conduit 40 is supplied with a constant pressure, the spool valve 46 serves to interconnect conduits 47 and 48 with conduits 38 and 20, respectively, and when conduit 41 is supplied with a constant pressure, conduits 48 and 47 are in communication with conduits 38 and 20, respectively. Two grooves 4602 and 4603 are provided upon the right external portion of spool 4601, and a ball 4606, disposed within a bore 4605 of a housing 4604, is biased downwardly by means of a spring 4607 so as to engage one of the grooves 4602 or 4603 when the spool 4601 is moved to its right or left position, the idle movement of the spool 4601 therefore being prevented even if the relatively low pressure is supplied to the conduits 40 and 41.

The conduits 47 and 48 are also in communication with a spool valve generally indicated by the reference character 49, which includes a spool 4901 having three lands, as best seen in FIG. 1A, and the spool 4901 may be moved upwardly by means of a spring 4902 and downwardly by means of the pressure within conduit 23. When the constant pressure within conduit 20 is supplied to conduit 23, the spool valve 49 serves to provide communication between the conduits 47 and 48, and the conduits 50 and 51, respectively, and when the constant pressure is not supplied to conduit 23, the conduits 47 and 48 are in communication with conduits 51 and 50, respectively.

The spool valve 37, which is in fluidic communication with conduits 50 and 51 which are connected to spool valve 49, includes a spool 3701 having three lands, and the spool 3701 is adapted to be moved upwardly by means of the fluid pressure within conduit 50 and be moved downwardly by means of the fluid pressure within conduit 51. When the pressure within conduit 50 is greater than the pressure within conduit 51, the conduits 34 and 35 are in communication with conduits 53 and 54, respectively, while when the pressure within conduit 51 is greater than the pressure within conduit 50, the conduits 34 and 35 are in communication with conduits 54 and 53, respectively.

Another spool valve, generally indicated by the reference character 56, is in communication with conduits 53 and 54 of valve 37 and is seen to include a spool 5601 which is biased upwardly by means of a spring 5602 and is biased downwardly by means of the fluid pressure within a conduit 57. When constant pressure is not supplied to conduit 57, the conduits 53 and 54 are in communication with conduits 58 and 59, respectively, while when constant pressure is supplied to conduit 57, communication between conduits 53 and 54 and conduits 58 and 59, respectively, is interrupted or terminated.

A conduit 58 is in fluidic communication with a lower chamber 6002 of an actuator, generally indicated by the reference character 60, while a conduit 59 is similarly in communication with an upper chamber 6001 thereof. Conduits 58 and 59 are also connected to valve 56, and a piston 6003 of actuator 60 is connected, at its lower end, to the displacement control means of the first pump-motor 1204. The conduit 57 is in communication with conduit 62 through means of shuttle valve 61 and is likewise in communication with conduits 64 and 65 through means of a shuttle valve 63, conduit 64 being in communication with a spool valve, generally indicated by the reference character 66, while conduit 65 is similarly in communication with a spool valve, generally indicated by the reference character 67.

The spool valve 66 includes a spool 6202 which is biased upwardly by means of a spring 6601 and the fluid pressure supplied, through means of an orifice 68, from the conduit 47, and a piston 6603 similarly biases the spool 6602 downwardly in response to the fluid pressure within conduit 41. When constant pressure is not supplied to conduit 41, conduit 64 is in communication with the reservoir, while when constant pressure is supplied to conduit 41, conduit 64 is disconnected from the reservoir and communication with conduit 20 is established.

The spool valve 67 is similarly seen to include a spool 6702 which is moved upwardly by means of a spring 6701 and the fluid pressure supplied through means of an orifice 69, from conduit 48, while a piston 6703 biases the spool 6702 downwardly as a result of the pressure within conduit 40. When constant pressure is not supplied to conduit 40, conduit 65 is in communication with the reservoir, and when constant pressure is supplied to conduit 40, conduit 65 is disconnected from the reservoir and communication with conduit 20 is established. An orifice 73 is provided within conduit 38 near spool valve 46 for ensuring the high pressure within conduits 47 and 48 upon operation of the spool valve 46.

In operation, when the engine 10 is not in operation and pressure is not supplied to conduit 25, the by-pass clutch valve 14 provides communication between conduit 1229 and conduit 1230 and the hydromechanical transmission 12 is in the neutral condition. The engine 10 is then actuated after the manual lever 15 has been brought to the neutral position N, and consequently, the by-pass clutch valve 14 maintains the communication between conduits 1229 and 1230 even the hydraulic pressure, corresponding to the rotational speed of the engine, is supplied to the conduit 25 and thus, the transmission 12 is maintained in the neutral position so as to thereby permit idling operation of the engine 10. While the engine is operated at its idling speed or in its idling mode, the comparative amplifier 32 generates the setting signal for decreasing the speed ratio.

The conduits 47 and 48 are in communication with conduits 20 and 38 due to the disposition of spool valve 46, and consequently, the constant pressure of conduit 20 is applied to the first clutch 1227 through means of conduit 47, the constant pressure within conduit 47 also being supplied to spool valve 66 so as to connect conduit 64 with the reservoir. Accordingly, conduit 57 is also in communication with the reservoir and the conduits 53 and 54 are in communication with conduits 58 and 59, respectively. The conduits 47 and 48 are also in communication with conduits 51 and 50, respectively, so as to supply the constant pressure within conduit 47 to conduit 51, and thus, the spool valve 37 serves to provide communication between the conduits 34 and 35 and the conduits 54 and 53, respectively. The constant pressure within conduit 34 is in turn supplied to the upper chamber 6001 of actuator 60 so as to set the displacement of the first hydraulic pump motor 1204 $-D_M$ as seen within FIG. 2.

When the manual lever 15 is shifted to the forward drive position F from the neutral position N, the conduit 17 is disconnected from conduit 20 and is in communication with conduit 19 due to the disposition of spool valve 16, the by-pass valve 14 thereby controlling the communication between the conduits 1229 and 1230 in response to the engine rotational speed. The conduits 22 and 23 are likewise in communication with the conduits 20 and 19, respectively, due to the disposition of spool valve 16, and consequently, the constant pressure within conduit 20 is supplied to the left chamber 2102 of actuator 21 thereby moving the piston 2101 toward the right. In this manner, the clutch sleeve 1211 is disengaged from the clutch gear 1215 and is enmeshed with the clutch gear 1214, the shifting movement of the piston 2101 being temporarily slow until the clutch sleeve 1211 is enmeshed with the clutch gear 1214. The communication between conduits 1229 and 1230 is temporarily interrupted due to the dynamic reaction of valve 14 to the communication of conduits 20, 29 as shaft 30 and valve 28 integral therewith move through the neutral position N of sleeve 1211, and consequently, the power of the input shaft 1201 is transmitted to the rotatable shaft 1209 so that the clutch sleeve 1211 is rotated substantially at the same speed as that of the clutch gear 1214. The spool valve 28 permits the conduit 29 to communicate with the conduit 19 and when the communication between conduits 1229 and 1230 is reestablished, the clutch sleeve 1211 is enmeshed with the clutch gear 1214.

After the throttle opening of engine 10 is increased, the engine rotational speed is increased so as to allow the by-pass clutch valve 14 to interrupt the fluidic communication between conduit 1229 and conduit 1230, and thus, the engine power is transmitted to the output shaft 1213 from the input shaft 1201 to thereby commence the forward drive operation. When the engine rotational speed then exceeds the value corresponding to the throttle opening, the comparative amplifier 32 generates the setting signal for increasing the speed ratio so as to prevent the increase in engine rotational speed, and when conduit 34 is in communication with the reservoir due to the disposition of servo valve 33, conduit 35 is simultaneously disposed in communication with conduit 20.

The constant pressure supplied to conduit 35 is then supplied to the lower chamber 6002 of actuator 60 so that the displacement of the first pump-motor 1204 from $-D_M$ to $D^*$ is controlled by means of actuator 60, and thus, the speed ratio $e$ of the hydromechanical transmission 12 is increased. The continuous supply of constant pressure to conduit 35 will vary the displacement of the first pump-motor 1204 continuously toward $D^*$ so as to increase the speed ratio of the transmission, and when the displacement approaches $D^*$ the speed ratio is brought to the mode switching-over speed ratio $e^*$ wherein the rotational speed of the first clutch 1227 corresponds to that of the second clutch 1228 thereby permitting the calculator 43 to energize the solenoid 4202 of solenoid valve 42. As a result, the constant pressure within conduit 20 is supplied to conduit 39, and since the constant pressure within conduit 39 is in turn supplied to conduit 40, the spool valve 46 permits conduit 48 to communicate with conduit 20 and thereafter conduit 47 to communicate with conduit 38. Thus, the second clutch 1228 is actuated and the first clutch 1227 is de-actuated so as to switch over the transmission 12 from its low operational mode to its high operational mode.

Due to the reversal of the hydraulic pressure within conduits 47 and 48, the spool valve 37 serves to connect conduits 53 and 54 with conduits 34 and 35, respectively, and in this manner, the constant pressure within conduit 35 i supplied to the upper chamber 6001 of actuator 60 through means of conduit 59 so that the displacement of the first pump-motor 1204 is varied, toward the value $-D_M$ from a value nearly that of $D^*$, by means of the actuator 60, the speed ratio $e$ thereby being further increased. When the speed ratio of the transmission 12 is increased above the mode switching-over speed ratio $e^*$, the rotational speed of the first clutch 1227 does not correspond to that of the second clutch 1228, and consequently, the energization of the solenoid 4202 is terminated so as to disconnect conduit 39 from the conduit 20 and to connect the same to conduit 38, the conduit 48 being maintained in communication with conduit 30 due to the engagement of ball 4606 with groove 4602 of spool 4601.

When the constant pressure within conduit 20 is supplied to conduit 40, the spool valve 67 serves to disconnect conduit 65 from the reservoir and to provide or establish fluidic communication between conduit 65 and conduit 20 just prior to the actuation of spool valve 46 wherein groove 4603 of spool 4601 engages ball 4606, and thus, the constant pressure within conduit 20 is supplied to conduit 57 and then to the conduit 62. As a result, the operation of the actuator 60 is terminated by means of the spool valve 56, and conduit 1229 is connected with conduit 1230 by means of the by-pass clutch valve 14 so as to prevent the occurrence of any possible damage to the pump-motors and the conduits even if an error should occur within calculator 43. It should be noted that the operation of the actuator 60 is terminated in order to prevent the occurrence of any shock caused as a result of the displacement of the first hydraulic pump-motor 1204 being considerably different when the mode switching-over operation is accomplished from the value of the same at the start of the mode switching-over operation.

With respect to the constant pressure being supplied to conduit 48 due to the disposition of spool valve 46, the constant pressure is supplied to spool valve 67 through means of orifice 69 so that conduit 65 is once again in communication with the reservoir just after termination of the operation of spool valve 46. Thus, conduit 1229 is again disconnected from conduit 1230 by means of the by-pass clutch valve 14, and the conduits 53 and 54 are in communication with conduits 58 and 59, by means of the spool valve 56, respectively.

When the speed ratio is within the low operational mode and is increased to the mode switching-over ratio $e^*$, and the load upon the transmission or the throttle opening of the engine 10 is correspondingly increased, the comparative amplifier 32 generates the setting signal for decreasing the speed ratio and actuating servo valve 33 so as to provide communication between the conduits 34 and 35 and the conduit 20 and the reservoir, respectively. Thus, the decrease of the rotational speed of engine 10 is prevented by decreasing the speed ratio of the hydromechanical transmission 12, i.e. the rotational speed thereof is rapidly increasing up to the value corresponding to the throttle opening.

When the constant pressure is supplied to conduit 34, said spool valve 36 supplies the constant pressure which is supplied to said conduit 39 by means of said solenoid valve 42, to said conduit, and consequently the first and second clutches 1227 and 1228 are correspondingly maintained in a state. The spool valve 66 is likewise maintained in a non-actuated state so as to provide communication between conduit 64 and the reservoir since the constant pressure within conduit 47 is supplied thereto through means of restrictor orifice 68, and as a result, the constant pressure of conduit 34 is supplied to the upper chamber 6001 of the actuator 60 so as to vary the displacement of the first pump-motor 1204 toward the value $-D_M$ thereby decreasing the speed ratio of the hydrostatic transmission 12.

When the throttle opening of the engine 10 is decreased during the high operational mode, the comparative amplifier 32 generates the setting signal for increasing the speed ratio so as to rapidly decrease the engine rotational speed to the value corresponding to the throttle opening, and as a result of the signal of amplifier 32, servo valve 33 is actuated so that the constant pressure is supplied to conduit 35 so as to increase the speed ratio. When the engine rotational speed is decreased below the value corresponding to the throttle opening, the comparative amplifier 32 generates the setting signal for decreasing the speed ratio so as to correspondingly increase the engine rotational speed, and under these conditions, the constant pressure is supplied to conduit 34 by means of the servo valve 33 so as to thereby decrease the speed ratio of the transmission 12. When the speed ratio is decreased to the mode switching-over speed ratio $e^*$ the rotational speed of the first clutch 1227 corresponds to that of the second clutch 1228 so as to allow the calculator 43 to energize the solenoid 4202 of solenoid valve 42, and therefore, the constant pressure within conduit 20 is supplied to conduit 39.

The spool valve 36 serves to supply the constant pressure of conduit 39 to conduit 41 and to provide fluidic communication between conduit 40 and conduit 38. Similarly, the spool valve 66 is initially provides so as to supply the constant pressure of conduit 20 to conduit 57 through means of conduit 64 and shuttle valve 63, and subsequently, conduits 53 and 54 are disconnected from conduits 58 and 59, respectively, by means of spool valve 56 so as to de-actuate actuator 60 and the first hydraulic pump-motor 1204, while the constant pressure within conduit 57 is supplied through means of shuttle valve 61, to conduit 62 so as to permit the bypass clutch valve 14 to provide fluidic communication between conduit 1229 and conduit 1230.

At this time, the spool valve 46 provide communication between conduit 47 and conduit 20, and thereafter, provides communication between conduit 48 and conduit 38. Thus, the first clutch 1227 is actuated while the second clutch 1228 is deactuated, thereby changing the mode of operation from a high operational mode to a low operational mode. After termination of the operation of spool valve 46, conduit 64 is again placed in communication with the reservoir and as a result thereof, spool valve 56 again serves to provide communication between conduits 53 and 54 and conduits 58 and 59, respectively, while by-pass clutch valve 14 similarly provides communication between conduit 1229 and conduit 1230. The spool valve 37 is also actuated due to the inversion of the pressure values within conduits 47 and 48, communication thereby being provided between conduits 34 and 35, and conduits 54 and 53, respectively, whereby due to the continuous supply of constant pressure to conduit 34, the speed ratio of the hydromechanical transmission is decreased. Accordingly, the rotational speed of the first clutch 1227 again does not correspond to that of the second clutch 1228 so that the energization of the solenoid 4202 is discontinued whereby conduit 39 is disconnected from conduit 20 and is connected with conduit 38, conduit 47 being maintained in communication with conduit 20 due to the engagement of ball 4606 with groove 4603 of spool 4601.

When the speed ratio is within the high operational mode and is decreased to the mode switching-over speed ratio $e^*$, and the load upon the transmission 12, or the throttle opening, is decreased, the servo valve 33 is actuated so as to communicate conduits 35 and 34 with conduit 20 and the reservoir, respectively, whereby an increase in the engine rotational speed is prevented and or, the engine rotational speed is rapidly decreased to a value corresponding to the throttle opening.

The spool valve 36 serves to supply the constant pressure within conduit 39, supplied through means of solenoid valve 42, to conduit 40 and therefore, the actuation of the second clutch 1228 and the de-actuation of the first clutch 1227 are maintained. The spool valve 67 is not actuated and serves to connect conduit 65 with the reservoir, even though the constant pressure is supplied to conduit 40, since the constant pressure within conduit 48 has also been supplied thereto for a long period of time. As a result, the constant pressure within conduit 35 is supplied to the upper chamber 6001 of the actuator 60 so as to vary the displacement of the first hydraulic pump-motor 1204 toward a value of $-D_M$ and to thereby increase the speed ratio of the transmission 12. When the throttle opening is decreased to its minimum amount, the speed ratio is correspondingly decreased in order to rotate the engine 10 at its idling speed and the by-pass clutch valve 14 serves to connect conduit 1229 with conduit 1230.

When the manual lever 15 is shifted to the reverse drive position R from the forward drive position F, the spool valve 16 serves to connect conduits 22 and 23 with the conduits 19 and 20, respectively, so that the constant pressure within conduit 20 is suppled to the right chamber 2103 of actuator 21 and the spool valve 49.

The spool valve 49 serves to connect conduits 47 and 48 with conduit 50 and 51, respectively, and consequently, the constant pressure within conduit 47 is supplied to conduit 50 whereby conduits 34 and 35 are in communication with conduits 51 and 50, respectively, through means of valve 37. Thus, the constant pressure within conduit 34 is supplied to the lower chamber 6002 of actuator 60 so as to vary the displacement of the first hydraulic pump-motor 1204 toward the value $D_M$ from the value $-D_M$.

Simultaneously, actuator 21 serves to disengage the clutch sleeve 1211 from the clutch gear 1214 and to engage the clutch sleeve 1211 with the clutch gear 1215, at which time, during the state wherein the clutch sleeve 1211 is not engaged with either of the clutch gears 1214 or 1215, the spool valve 28 serves to supply the constant pressure of conduit 20 to conduit 29 so that the fluidic communication between conduits 1229 and 1230 is discontinued and the clutch sleeve 1211 is rotated in the same direction, and with substantially the same rotational speed, as that of the clutch gear 1215. Thus, the clutch sleeve 1211 may be enmeshed with the clutch gear 1215 in a substantially synchronized condition.

Subsequently, after the throttle opening of the engine 10 is increased, the by-pass clutch valve 14 disconnects conduit 1229 from conduit 1230 thereby commencing the reverse drive operation. The speed ratio of the hydromechanical transmission 12 is then varied in order to maintain the engine rotational speed at the predetermined value corresponding to the throttle opening in accordance with the change in the load of the transmission 12 and the throttle opening, and such operation will be assumed to be understood from the detailed description of the forward drive operation set forth hereinbefore, and consequently, a detailed description of such reverse operation has been omitted herefrom.

Figure 3:
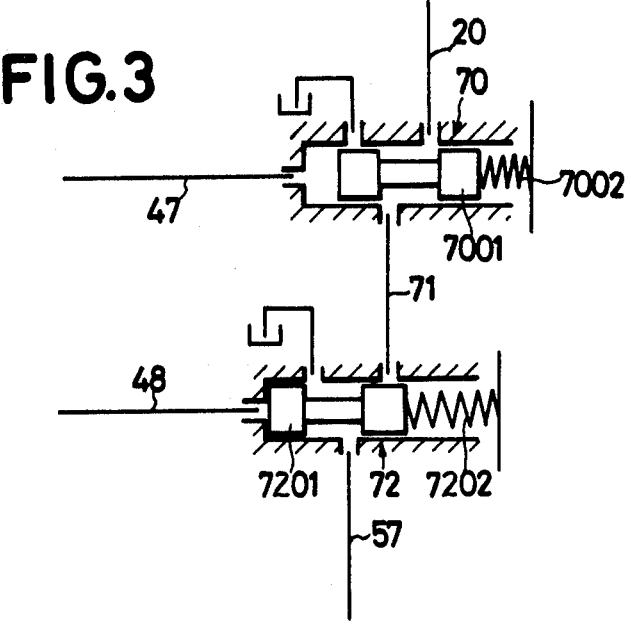
FIG. 3 is a schematic diagram of a modification of particular valves utilized within the portion of the transmission shown in FIG. 1B.

It is to be noted that the spool valve 66 and 67 within FIG. 1B may be modified as shown for example within FIG. 3 whereby a spool 7001 of a spool valve, generally indicated by the reference character 70, is adapted to be moved toward the right by means of the pressure within conduit 47, and toward the left by means of the biasing force of a spring 7002. When the constant pressure is not supplied to conduit 47, the spool valve 70 serves to connect a conduit 71 with the reserovir, while when the constant pressure is supplied to conduit 47, the conduit 71 is in communication with conduit 20 so as to receive the constant pressure thereof.

A spool 7201 of a spool valve, generally indicated by the reference character 72, is adapted to be moved toward the right by means of the pressure within conduit 48 and toward the left by means of the biasing force of a spring 7202. When constant pressure is not supplied to conduit 48, the spool valve 72 serves to connect conduit 57 with the reservoir, while when the constant pressure is supplied to conduit 48, conduit 57 is in communication with conduit 71. It is to be noted that only when the constant pressure is supplied to both of the conduits 47 and 48 is the constant pressure within conduit 20 supplied to conduit 57.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. In a hydro-mechanical transmission having an input shaft, an output shaft, a differential gear set including an input element connected to said input shaft and an output element connected to said output shaft, a first positive displacement hydraulic pump-motor connected to said input shaft, a second hydraulic pump-motor connected to said first hydraulic pump-motor through a pair of conduits, a first clutch connected to said second hydraulic pump-motor for performing a low operational mode of a low speed ratio, and a second clutch connected to said second hydraulic pump-motor for performing a high operational mode of a high speed ratio, the operational modes thereof being switched-over when the rotational speed of said first clutch corresponds to or is synchronized with that of said second clutch an actuator connected to said first hydraulic pump-motor for varying the displacement ratio of said first hydraulic pump-motor, and a calculator operatively associated with said first and said second clutch the improvement which comprises:

a solenoid valve operatively associated with said first and second clutch actuable in response to a signal of said calculator indicating the synchronous condition of said clutches;
a first valve means operatively associated with and connected to said solenoid valve and actuable by a setting signal for increasing or decreasing the speed ratio of said transmission;
a second valve means connected to and actuable by said first valve means for supplying the hydraulic pressure selectively to said first clutch or said second clutch; and
a third valve means operatively connected with said actuator for controlling said actuator in response to the movement of said second valve means.

2. A transmission set forth in claim 1, further comprising:
a first spool valve operatively connected with said second and third valve means for changing the forward - reverse drive operation.

3. A transmission as set forth in claim 1, further comprising:
a second spool valve operatively associated with said actuator and said third valve means for interrupting the supply of fluid pressure to said actuator when both of said clutches are actuated.

4. A transmission as set forth in claim 3, further comprising:
spool valve means operatively associated with said second spool valve for retarding the re-establishment of said supply of fluid pressure to said actuator by said second spool valve.

* * * * *